United States Patent [19]

Anderson et al.

[11] E Re. 29,788

[45] Reissued Sep. 26, 1978

[54] INVERTER HAVING FORCED TURN-OFF

[75] Inventors: Thomas E. Anderson, Normal, Ill.; John P. Walden, Schenectady, N.Y.

[73] Assignee: General Electric Company, Schenectady, N.Y.

[21] Appl. No.: 764,695

[22] Filed: Feb. 1, 1977

Related U.S. Patent Documents

Reissue of:

[64] Patent No.: 3,953,780
Issued: Apr. 27, 1976
Appl. No.: 516,772
Filed: Oct. 21, 1974

[51] Int. Cl.[2] ..... H02M 7/537

[52] U.S. Cl. ..... 363/97; 363/56; 363/133

[58] Field of Search ..... 331/113 A; 363/22-25, 363/55, 56, 80, 97, 131, 133

[56] References Cited

U.S. PATENT DOCUMENTS

| | | | |
|---|---|---|---|
| 3,056,077 | 9/1962 | McCarter | 363/133 |
| 3,305,756 | 2/1967 | Doss et al. | 331/113 A X |
| 3,334,312 | 8/1967 | Funfstuck | 331/113 A |
| 3,350,661 | 10/1967 | Bloom et al. | 331/113 A |
| 3,369,195 | 2/1968 | Zollinger et al. | 331/113 A |
| 3,387,228 | 6/1968 | Randall | 331/113 A |
| 3,500,168 | 3/1970 | Merritt | 321/18 |
| 3,601,682 | 8/1971 | Iwata et al. | 363/133 |
| 3,646,578 | 2/1972 | Gregory | 331/113 A X |
| 3,758,841 | 9/1973 | Bourdeau | 321/14 |
| 3,781,638 | 12/1973 | Anderson et al. | 363/56 |

*Primary Examiner*—William M. Shoop
*Attorney, Agent, or Firm*—Lawrence D. Cutter; Joseph T. Cohen; Marvin Snyder

[57] ABSTRACT

An electrical inverter circuit for converting d.c. electrical input into an a.c. electrical output involving the control of active switch elements in the primary of an output transformer circuit by, in part, providing a further controllable active element in circuit with the active element switches such that the primary winding current also flows therethrough. Synchronous control means are provided for synchronously controlling this further active element so as to increase its electrical impedance during at least a portion of each switching transition of the active element switch means so as to further aid and promote the rapid and efficient transitioning of the active element switches. Various alternative circuits are shown for this and for detecting the switch point as a function of primary transformer winding current and for further controlling the transition of the active switches in combination with the increased electrical impedance of the further controllable active element in circuit therewith.

30 Claims, 6 Drawing Figures

Fig. 5
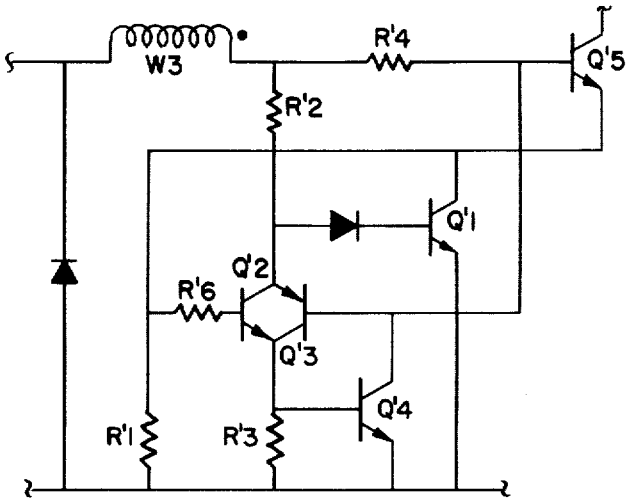
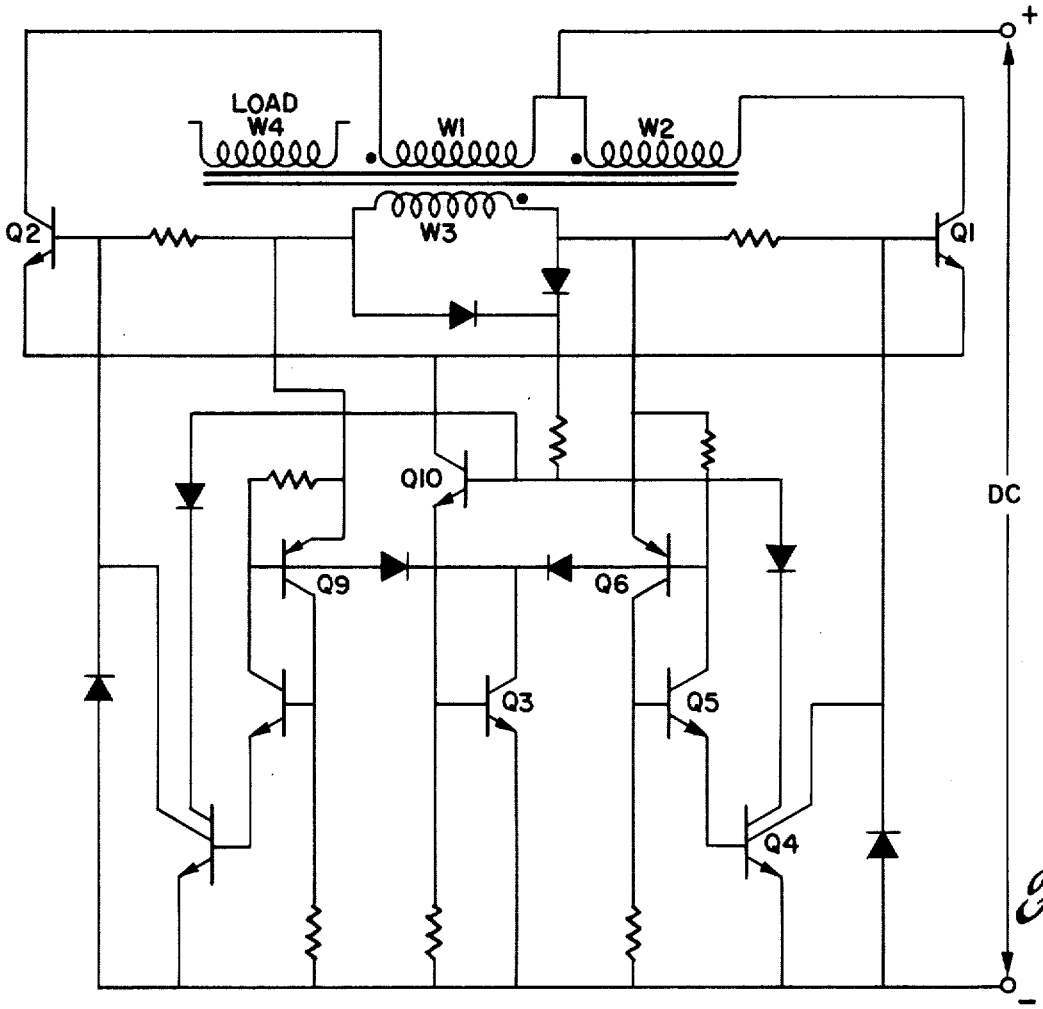
Fig. 6

INVERTER HAVING FORCED TURN-OFF

Matter enclosed in heavy brackets [ ] appears in the original patent but forms no part of this reissue specification; matter printed in italics indicates the additions made by reissue.

INVERTER HAVING FORCED TURN-OFF

This invention generally relates to an electrical inverter circuit for converting a d.c. electrical input into an a.c. electrical output. In particular, this invention relates to an improved control for active element switches utilized to alternately switch the d.c. electrical input through the primary winding of a transformer thus giving rise to an a.c. output in a secondary winding thereof.

Switching mode power supplies of this general type are becoming increasingly popular for a variety of applications as evidenced by such recent publications as various articles in the Monday, Sept. 23, 1974 issue of Electronic Engineering Times and the July 1974 issue of Mullard Technical Communications No. 123. Switching mode power supplies conforming to this general classification are also found in issued U.S. Pat. such as, for instance, Nos. 3,161,834; 3,136,958; 3,546,626; and 3,758,841.

Our own earlier U.S. Pat. No. 3,781,638 issued Dec. 25, 1973 describes a switching mode power supply utilizing active element switches (e.g., transistor devices) for alternately switching a d.c. supply current through the primary windings of a transformer thus giving rise to an a.c. output in a secondary winding. The correct phase and magnitude of control power for maintaining sustained repetitive switching operation of the switching transistors is obtained in this earlier circuit from a tertiary low voltage winding on the output transformer. In addition, our earlier issued and above referenced patent (which earlier patent is commonly assigned with the instant application) also utilizes a control transistor which helps to positively turn the switching transistors "off" at the end of each half-cycle of inverter operation as determined by detecting the predetermined level of primary winding current.

The instant invention relates to further improvements in the control circuitry for controlling the switching transistors in a switching mode inverter and, in the preferred exemplary embodiment, to an improved switching control for the particular type of switching mode inverter described in our earlier issued and above referenced U.S. Pat. No. 3,781,638.

Some of the features of this invention are also disclosed in conjunction with another invention of John P. Walden in a commonly assigned copending United States Patent Application filed concurrently herewith and entitled DC TO AC INVERTER HAVING IMPROVED SWITCHING EFFICIENCY, OVERLOAD AND THERMAL PROTECTION FEATURES.

In the past, switching control over the switching transistors has been effected primarily by influencing the bias current available at the control leads of such active element switches. For instance, in our above referenced patent, a switching control transistor detects a switch point at a predetermined level of primary winding current and, in response thereto, substantially shunts the base elements of the switching transistors to ground potential thus dissipating any forward bias currents and thereby turning these switching transistors off.

It has now been discovered that the switching operation can be enhanced and its efficiency can be improved by incorporating still further switching control features. For example, the instant invention includes the provision of a further controllable active element means in circuit with the active element switches such that the primary winding current also flows through this further controllable element. Synchronous control means are also provided for synchronously controlling the further active element so as to increase its electrical impedance during at least a portion of each switching transition for the active element switches. This action, in the preferred exemplary embodiments, causes a simultaneous and synchronous rise in emitter voltage for the switching transistors at the same time that the base voltage is drastically lowered. Since, in the exemplary embodiments, NPN switching transistors are utilized, this combined and synchronous switching control much more quickly and efficiently reverse biases the base-emitter junction of the switching transistors and effects the desired switching transition.

It has also been discovered that the increased voltage across this further controllable active element (due to its increased electrical impedance) may be utilized to further control the dissipation of any forward biasing currents at the control or base electrode of the switching transistors. This detected increase in voltage is also utilized in some embodiments of the invention as a feedback control signal for insuring that the further controllable active element is maintained in its high impedance state throughout the switching transition period.

The preferred current apparatus of this invention involves a current measuring element (e.g., a known electrical impedance, etc.) connected serially in a common collector-emitter switching transistor circuit together with a further controllable active element such that the primary winding current flowing to either of the switching transistors also flows through the current measuring element. Current level detection means (e.g., a transistor device with its control element connected thereto) is controlled by the current measuring element to, in turn, control the electrical impedance of the further controllable active element (e.g., a transistor device). However, other alternatives of current detection means have also been discovered to have potential advantages. Accordingly, such alternate means also form a part of this invention.

One such alternate current detection means involves a voltage divider connected across the current measuring means and a further controllable active element in conjunction with a voltage level detection means. Another current detection means comprises a current monitor such as an inverting current source connected only to the control element of the further controllable active element means thus eliminating the need for any extra impedance means in the primary winding current path.

Another alternate embodiment of this invention provides independent base and emitter controls for the two switching transistors and a common peak current detector for controlling the independent base and emitter control circuits.

Further alternative embodiments of this invention utilize a current sensitive latch means (e.g., an SCR like arrangement of NPN and PNP transistor devices) to provide a switching control hysteresis effect for insuring that positive switching control is maintained during the switching transition period until conditions are insured to be proper for completing the transition cycle.

These and other objects and advantages of the invention will be more clearly apparent upon reading the following detailed description of the invention taken in conjunction with the accompanying drawings of which:

FIG. 5 is a schematic diagram of a portion of still another alternate embodiment of this invention; and FIG. 6 is a detailed schematic diagram of a still further alternate embodiment of this invention.

Although the inverter of this invention will have many possible applications, one of the presently anticipated applications for this invention is its use in a line cord power supply unit. Such units are presently contemplated as very small volume and lightweight devices for plugging directly into a conventional 110–120 volt household a.c. receptacle. The output of such an unit is presently contemplated as a low voltage d.c. output for powering common household appliances within the power rating of the unit.

In such applications, it is necessarily to make the maximum usage of the limited available volume and weight. Accordingly, it is presently contemplated that the a.c. input would be directly converted to d.c. for powering a d.c./a.c. inverter (such as that described herein) operating at a relative high frequency) (e.g. 25 kHz). This high frequency a.c. output from the inverter would then be rectified and delivered as the final low voltage d.c. output from the line cord power supply unit.

As should be appreciated, operation of the inverter at such a high frequency permits transformer isolation and voltage conversion of fairly significant power levels without necessitating bulky and weighty transformer core materials. It is also contemplated that much of the electronic circuitry involved in elements such as the inverter would have to be constructed in a monolithic integrated form to meet the design restraints in such a power supply application. This invention is especially adapted to such an application since the circuitry involved herein is especially adapted for monolithic integrated circuit construction techniques.

To obtain high efficiency in such a switched mode power supply, it has been discovered that the switching losses in the switching transistors must be drastically reduced by properly biasing the transistor during turn off (e.g., during switching transition periods). Furthermore, this controlled switching bias must be obtained without the use of capacitors or auxiliary power supplies to enhance the adaptability of such inverters for applications such as the line cord power supply mentioned above.

Figure 1:
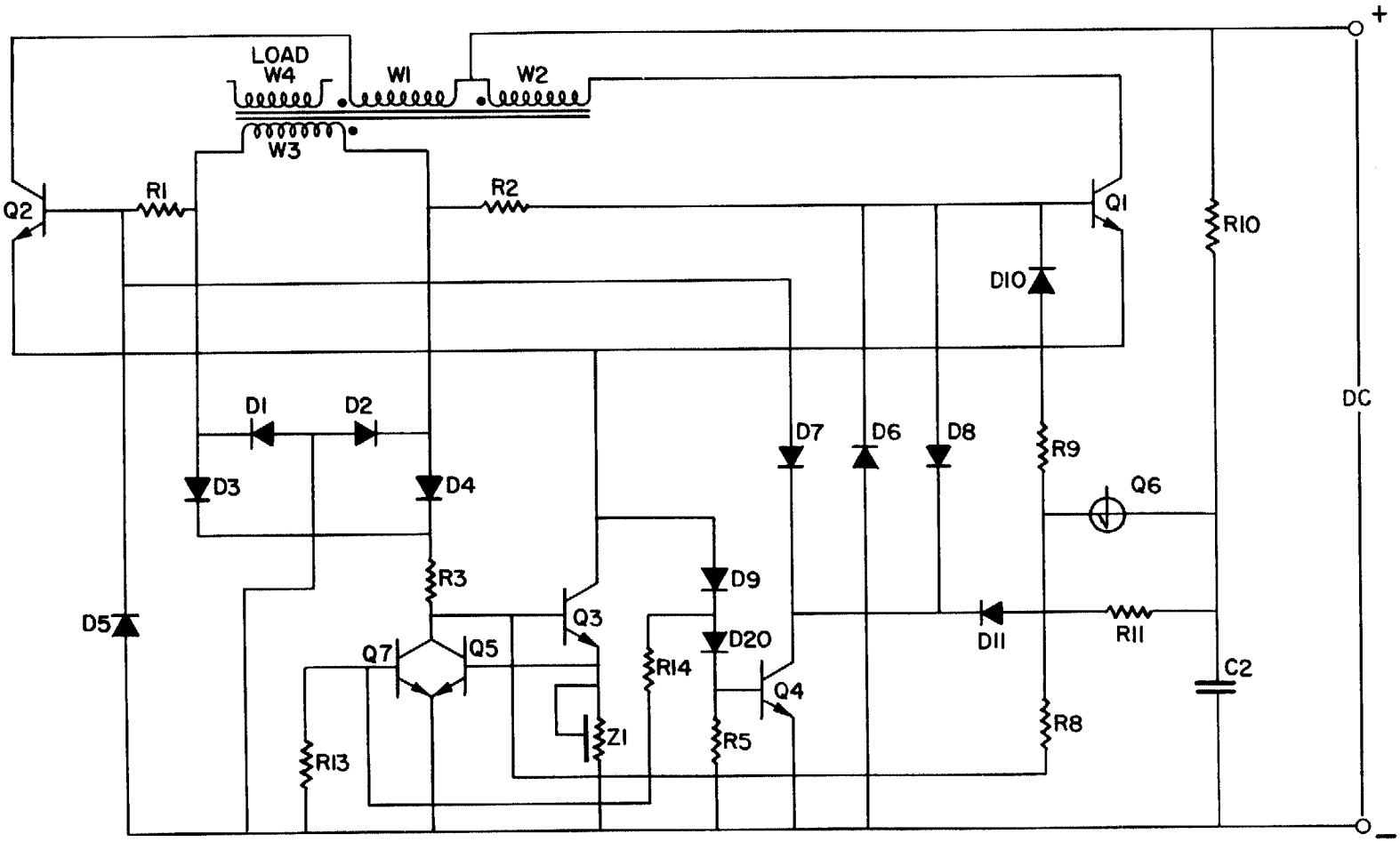
FIG. 1 is a detailed schematic diagram of a presently preferred embodiment of the invention.

Referring to FIG. 1, the starting circuit comprising Q6, D10, R8, R9, R10 and C2 will first be described. Initially, capacitor C2 is discharged. When a d.c. input is first applied to the inverter of FIG. 1, capacitor C2 begins to charge through resistor R10 with an appropriately preselected time constant. When the trigger voltage of Q6 is reached, Q6 breaks down and supplies a starting pulse of current to the base of Q1 through R9 and D10 and to the base of Q3 through R8. Thus, Q3 is forward biased to its "on" condition to complete the common emitter circuit for switching transistors Q1 and Q2. At the same time, Q1 is forward biased so as to turn Q1 to its on state thus permitting current to flow from the d.c. source through the center tap connection of the primary windings, through Q1, Q3 and Z1.

As will be explained in more detail below, transistor Q4, during normal inverter operation, is turned to its on state each half-cycle of inverter operation. At these times, the accomulated charge on C2 is discharged through R11 and D11 thus insuring that C2 never again reaches the trigger level of Q6 during normal inverter operation. Of course, should normal inverter operation be interrupted for some reason, then C2 would again be permitted to charge to the trigger level of Q6.

As the current builds up in the primary winding W2, voltages are induced in the secondary output winding W4 and in a low voltage tertiary winding W3. As can be seen from the dot convention shown in FIG. 1, the current flow generated in tertiary winding W3 by current flow through W2 and Q1, etc., is in the proper direction to supply base current to Q1 through R2, Q1, Q3, Z1 and D1. At the same time, base current is provided to Q3 via D4, R3, Q3, Z1 and D1. Accordingly, once inverter operation is initiated by a starting pulse from Q6, the switching transistor Q1 and control transistor Q3 are maintained in their on conditions by self-induced currents in tertiary winding W3.

The primary winding current passing through W2, Q1, Q3 and Z1 is a function of both the load and transformer core characteristics. As time progresses, the primary winding current increases due to magnetizing current and, ultimately, it increases quite rapidly as the magnetic circuit of the transformer approaches saturation. By properly selecting Z1, the transistor Q5 will be caused to turn on due to the voltage drop across Z1 just at the onset of magnetic core saturation and/or during overload conditions which would cause excessive current through Z1. The function then of Z1 in the exemplary embodiment of FIG. 1 is to maintain the base-emitter voltage of Q5 below is intrinsic turn on voltage level until the primary winding current flowing therethrough reaches a predetermined level. In effect then, Z1 in combination with Q5 acts as a current detector with Z1 being a current measurement means and Q5 being a current level detector. Ideally, a constant current sink would be utilized for Z1 but Z1 can also be successfully approximated by a resistor, diode, transistor or combinations thereof in a monolithic integrated circuit construction as will be apparent.

As shown in FIG. 1, the current detection circuit is common to both the main power transistors Q1 and Q2. It is also possible to utilize individual current detection circuits for each switching transistor; however, the use of a single current detector as in FIG. 1 is preferred since it reduces the number of components which must be included in the integrated circuit construction and provides for a more symmetrical operation of the inverter.

When the predetermined level of primary winding current is detected by Z1 and Q5, Q5 turns on as noted above thus diverting base current from Q3 and thus permitting Q3 to come out of saturation thereby increasing the electrical impedance in the collector-emitter circuit of Q3. Since Q3 is no longer saturated, its collector voltage is now permitted to rise bringing with it the emitter voltages of switching transistors Q1 and Q2 to which it is connected. As the electrical impedance across the collector-emitter of Q3 increases and as the voltage temporarily increases at the collector of Q3 due to the current flow therethrough, diode Q9 will act as a voltage level detector in becomming conductive at a predetermined voltage level. When this occurs, transistor Q7 is also biased to its on state via resistor R14. The conduction Q7 further turns Q3 to its off state and maintains it there during the switching transition period. In addition, diode D20 will also conduct as the voltage rises at the collector of Q3 thus shifting the remaining primary winding current from the collector emitter circuit of Q3 to the base-emitter circuit of Q4 to cause Q4 to abruptly saturate and reduce the base elements of switching transistors Q1 and Q2 to a nearly ground potential through diodes D8 and D7 respectively. As previously mentioned, Q4 also discharges capacitor C2 through diode D11 and resistor R11. Accordingly, the net result of this combined control action is to cause the emitter voltage of Q1 to be abruptly increased at the same time that the base voltage thereof is abruptly decreased thus abruptly reverse biasing the base-emitter junction of Q1 to effect a rapid turn off of this switching transistor.

The stored energy in the magnetic fields of the transformer will subsequently cause a voltage reversal on all of the transformer windings. After such a reversal, transistors Q4, Q5 and Q7 will have come out of saturation due to a lack of forward biasing in the absence of current through their respective biasing circuits and base current will then be supplied to switching transistor Q2 from the tertiary winding W3 through resistor R1, Q2, Q3, Z1 and D2. At the same time, forward bias for the base of Q3 is also provided by the tertiary winding W3 through diode D3, resistor R3, Q3, Z1 and D2. In this case, Q2 and Q3 have now been turned on so that primary winding current passes through the center tap, winding W1, Q2, Q3 and Z1. When the total primary winding current through Z1 increases sufficiently to trigger Q5, another transition switching period will begin and proceed as described above to transition Q2 to its off state and Q1 to its on state by causing the emitter potential of Q2 to rise and simultaneously causing the base potential of Q2 to fall thus abruptly reverse biasing the base-emitter junction of Q2.

Diodes D5 and D6 are provided to limit the reverse peak base-emitter voltage across Q1 and Q2 during periods of negative collector current on Q1 and Q2 which occur during switching transition periods because of the transformer reaction to the current switching transition. An alternate possibility would involve placing the cathodes of diodes D5, D6 to the collectors of Q1, Q2 respectively instead of the bases of Q1, Q2.

The secondary winding W4 of the output transformer would be connected to a load such as, for example, a rectifier, etc. As indicated in FIG. 1, the primary, secondary and tertiary windings are magnetically coupled one to another.

Figure 2:
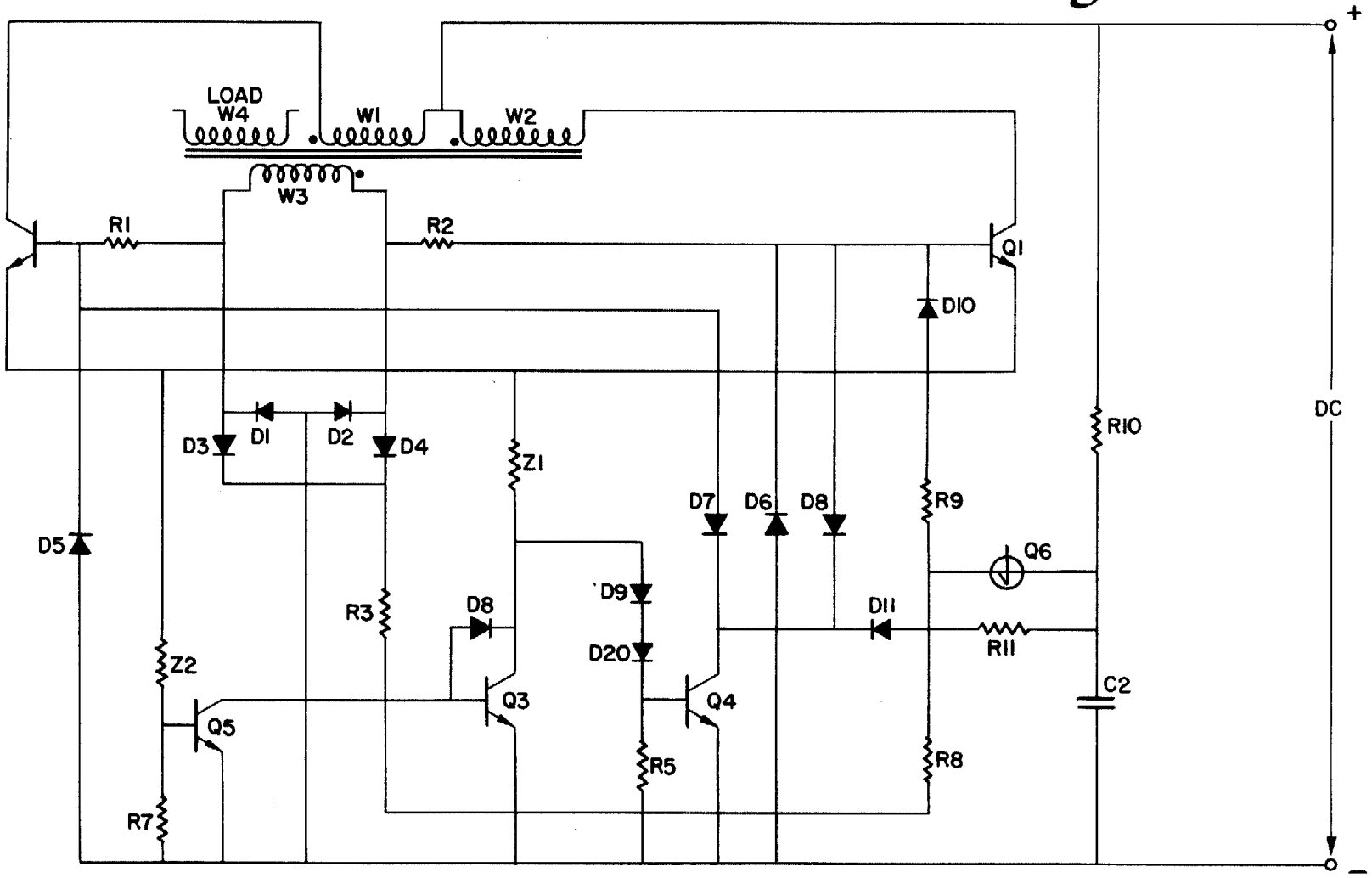
FIG. 2 is a detailed schematic diagram of an alternate embodiment of this invention.

The alternate embodiment shown in FIG. 2 is quite similar, in general, to the preferred embodiment of FIG. 1, Accordingly, the same reference numerals have been utilized in FIGS. 1 and 2 to denote elements having similar functions. The starting circuitry and the basic switching and operation of the inverter shown in FIG. 2 is quite similar to that already described with respect to FIG. 1. The basic difference between FIG. 1 and FIG. 2 involves the current detection technique utilized in FIG. 2. Once the inverter of FIG. 2 has been initiated in operation, the primary winding current flows through, for instance, Q1, Z1 and Q3. A voltage is then developed across Z1 and Q3 which is proportional to the primary winding current. A voltage divider Z2 and R7 is connected in parallel across this voltage so as to reflect a desired proportion thereof to the base of transistor Q5 through Z2. Although the ideal characteristics of Z1 and Z2 are a current sink and voltage clamp respectively, either can be approximated by resistors, diodes, transistors, or combinations thereof, etc., in monolithic integrated structures as will be appreciated. When the primary winding current through Z1 and Q3 and hence the voltage thereacross reaches a desired design limit, Q5 will be turned on as in the embodiment of FIG. 1 to initiate a sequence of events causing transition between the switching transistors Q1 and Q2. In this embodiment, Q5 is already inherently controlled by the increase in impedance of Q3's collector-emitter circuit (and hence as increased voltage across the voltage divider controlling Q5) thus Q7 from FIG. 1 has been eliminated in FIG. 2. Otherwise, the switching transition control is the same as previously described with respect to FIG. 1.

Figure 3:
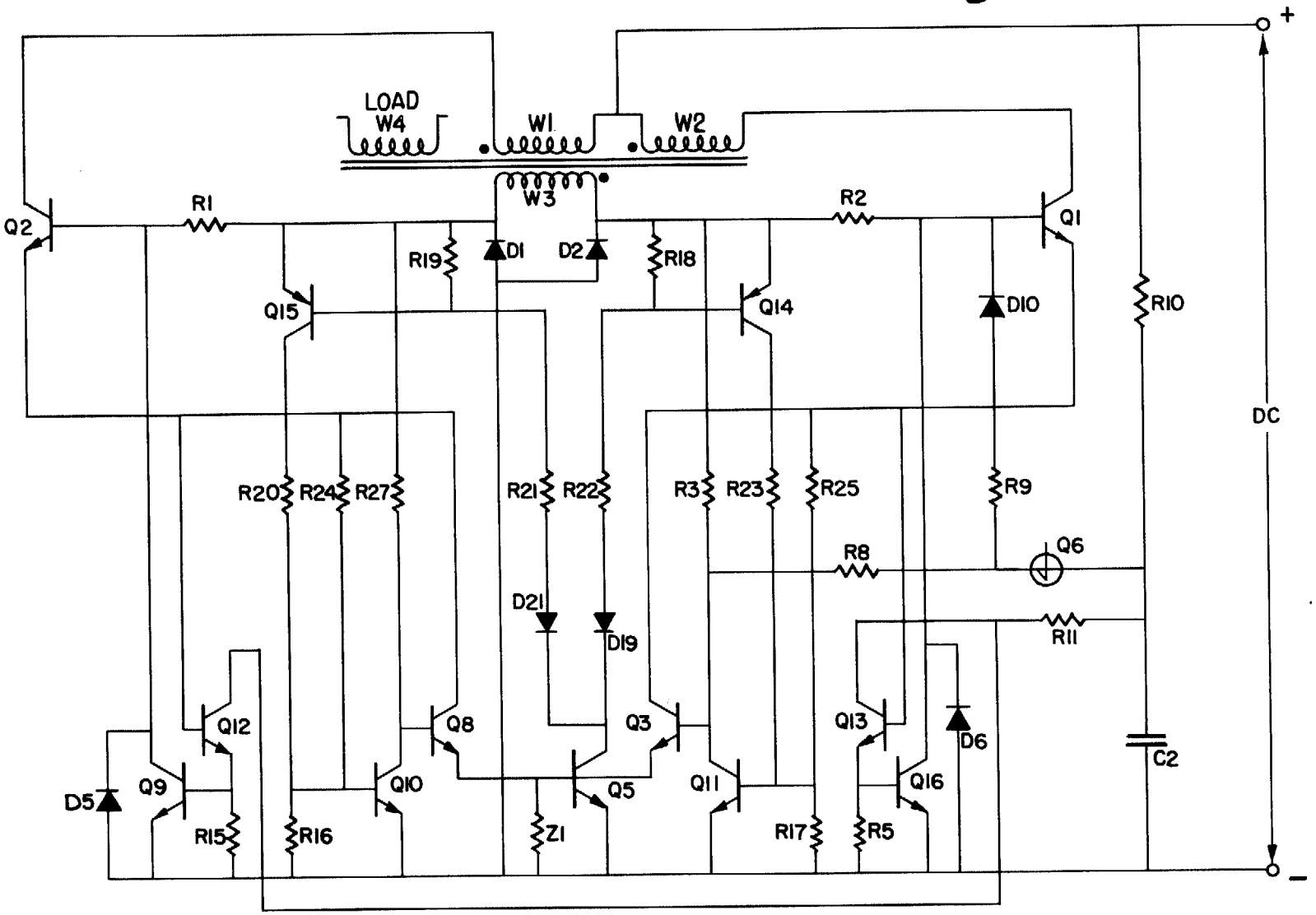
FIG. 3 is a detailed schematic diagram of still another alternate embodiment of this invention.

The alternate embodiment shown in FIG. 3 is also quite similar in principle to the preferred embodiment of FIG. 1. However, the circuitry in FIG. 3 provides independent base and emitter controls for the switching transistors Q1 and Q2, each of these independent sets of controls being commonly triggered by a common current detector. As before, elements shown in FIG. 3 having correspondingly counterparts in the circuitry of FIG. 1 are identified with the same reference characters.

The starting circuitry of FIG. 3 is the same as that described in FIG. 1. The starting current phase from Q6 through R8 provides base current to turn on Q3 and, at the same time, through R9 and D10, base current is provided to turn on Q1. Thus, as before, primary winding current is caused to flow through W2, Q1, Q3 and Z1. When the current through Z1 reaches a predetermined level, Q5 will be turned on and, in turn, Q14 will also be turned on through D19 and R22. The corresponding control transistor Q15 for Q2 does not now transition to its on state because of the voltage drop across diode D1 which holds the emitter of Q15 below ground potential.

As Q14 is thus turned on, Q11 is also provided with base current and thus turned on through resistor R23 which, in turn, turns Q3 off causing the electrical impedance between the collector-emitter of Q3 to rise and, accordingly, to cause a corresponding rise in the emitter voltage of Q1. The resulting increased voltage drop across R25 provides enough base current to maintain Q11 in its on state during the switching transition period. Furthermore, the increased voltage at the emitter of Q1 also turns on transistors Q13 and Q16, the latter of which abruptly lowers the base voltage of Q1. Accordingly, the result of this combination of actions is to abruptly raise the emitter voltage of Q1 while simultaneously and synchronously abruptly lowering the base voltage of Q1 thus reverse biasing the base-emitter junction of Q1 and causing a quick and efficient transition of its off state. Transistor Q13 is utilized to provide and additional diode voltage drop in series with the base of Q16 to insure that Q16 does not prematurely turn on and, in addition, to periodically discharge starting capacitor C2 through R11. Since Q12 is inactivated during this half cycle, it does not affect operation at this time.

Subsequently, in the switching transition period, the voltage on the transformer windings will reverse due to the stored magnetic energy therein thus allowing the primary winding current to flow through Q2 due to the forward biasing of Q2 and Q8 by the current now supplied by tertiary winding W3 in a manner completely analogous to that already discussed with respect to earlier embodiments of this invention. Since the circuit of FIG. 3 is completely symmetric with respect to Q2, the second half cycle and all succeeding cycles of inverter operation in the circuit of FIG. 3 should now be apparent.

Components R18, R19, R16, R17, R5 and R15 are included to guarantee that Q14, Q15, Q10, Q11, Q16 and Q9 respectively remain off in the absence of any definite base current thereto.

Figure 4:
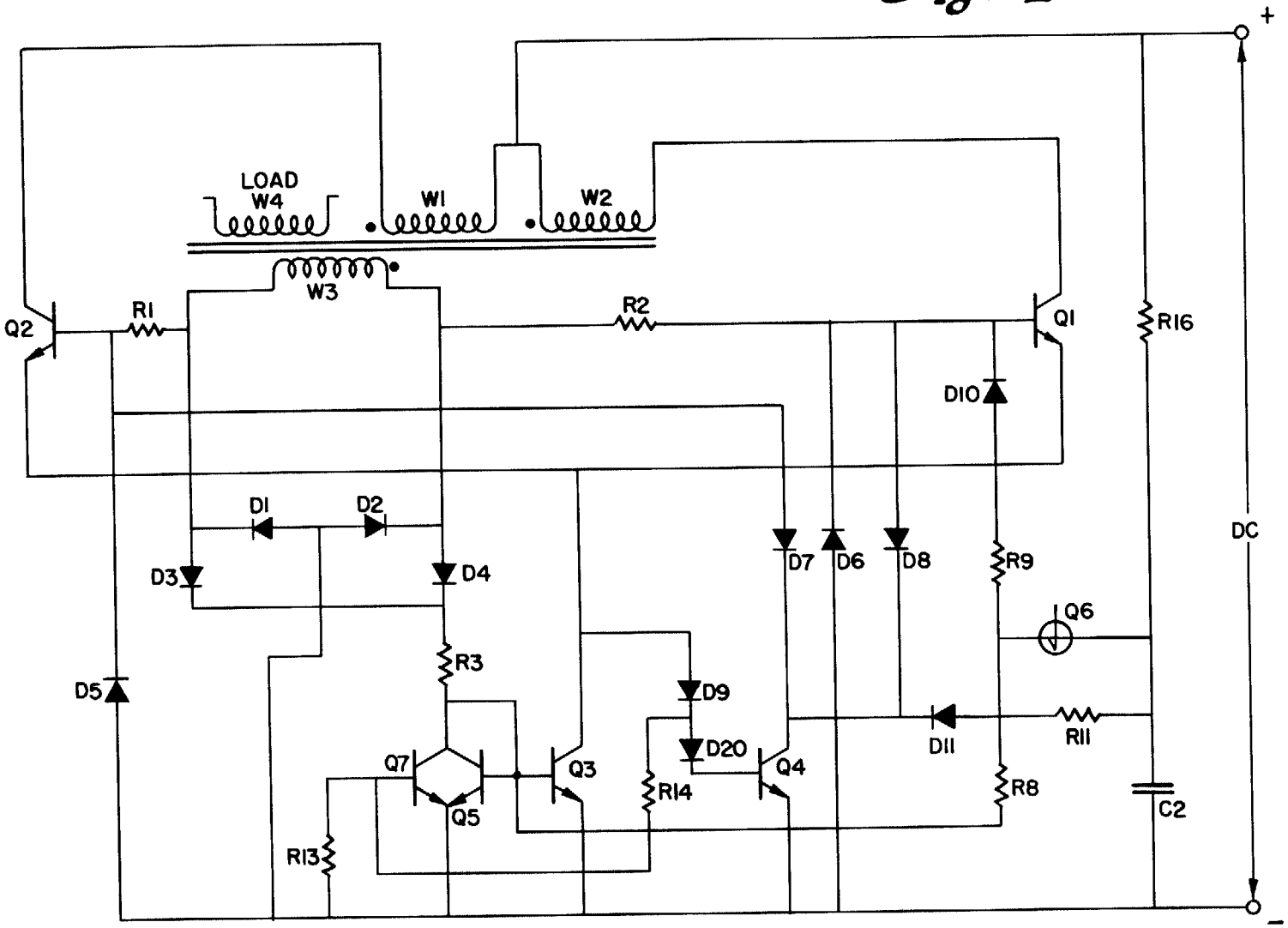
FIG. 4 is a detailed schematic diagram of yet another alternate embodiment of this invention.

The alternate inverter circuitry shown in FIG. 4 involves yet another type of current detecting arrangement. Here, most of the circuit is identical with that already discussed in FIG. 1 and the same reference numerals are utilized for corresponding parts in the two figures.

It will be noted that FIG. 4 does not include the impedance Z1 as the current measuring element. Rather, an inverting current source Q3–Q5 is utilized as the peak current detector. No special impedance element such as Z1 is required since the Q3–Q5 combination completely provides a current sensing means. The direct connection between the collector of Q5 and the base of Q3 and of Q5 provides an inverting current source. By further selecting the active area of transistor Q3 to have a predetermined ratio to the active area of transistor Q5 (e.g., to make Q3 roughly 100 times as large as Q5) a predetermined current inverting gain (e.g., 100) is obtainable. That is, where the ratio is 100 to 1, if 1 mA is supplied from R3, Q3 will be a 100 mA current source.

Once started, Q3 will remain in saturation until the collector-emitter current therein is equal to the current in R3 times the gain of the Q3–Q5 current inverting source. At this point, transistor Q3 becomes active thus causing the collector of Q3 to rise in voltage with increasing current. Once this increasing voltage is detected by diodes D9, D20, etc., Q7 is turned on and Q3 is thereby turned off again diverting the primary winding current remaining to the base of Q4 with the ensuing switching action being exactly as is already described with respect to FIG. 1.

The portion of control circuitry shown in FIG. 5 illustrates the provision of substantial hysteresis in the control circuitry to achieve an especially effective and insured switching control over a switching transistor such as Q5′ shown in FIG. 5. For instance, it has been noted that in some instances it is desirable to provide such hysteresis if the interwinding capacitance of the transformer is large or if the switching characteristics of switching transistor Q5′ are extremely fast. In such cases, it is sometimes possible to completely turn Q4′ off even though there may still be sufficient base drive voltage available across tertiary winding W3 to partially turn Q5′ back on again before the successful completion of the desired switching transition period. To avoid this potential problem, it is possible to build in hysteresis within the control circuitry so that the switching transistor Q5′ is forced to remain in its off state so long as there is any remaining voltage across tertiary winding W3 in a sense that might potentially provide forward bias current therefor.

As the tertiary winding W3 supplies forward bias base current to Q5′ through R4′, control transistors Q2′, Q3′ and Q4′ are all off. In this particular embodiment, the primary winding current flows through Q5′ and the parallel combination of Q1′ and R1′. As the current builds in the primary winding and hence in Q5′ and the parallel combination of Q1′ and R1′, the voltage across the base-emitter junction of Q2′ increases sufficiently to turn Q2′ on at a predetermined peak current level. At this time, control transistor Q1′ then turns off causing all of the remaining primary winding current to flow through R1′ and Q2′. Accordingly, at this time, the voltage drop across R1′ increases significantly to insure that Q2′ and Q4′ are turned on. Of course, in response to turning Q4′ on, Q3′ is also turned on. As may be appreciated from FIG. 5, the net result of these actions is, as before, to cause the emitter voltage of the switching transistor to rise while, simultaneously, significantly lowering the base voltage thereof thus abruptly reverse biasing the base-emitter junction of the switching transistor to cause the desired switching transition.

In addition, transistors Q3′ and Q4′ form a current sensitive latch means which operates in a manner similar to an SCR thus remaining on until the voltage across tertiary winding W3 actually reverses thus lowering the current through Q3′, Q4′ below the predetermined level necessary to maintain it in its on condition.

Although the circuit of FIG. 5 would work without Q1′, its provision provides a faster switching transition period.

A more complete inverter circuit employing the SCR type of shutdown technique explained in FIG. 5 is shown in the detailed circuitry of FIG. 6. The FIG. 6 circuit also provides a common current sensing means.

The starting circuitry is not shown in FIG. 6. Accordingly, the explanation of FIg. 6 will begin with an assumption that transistors Q1 and Q10 have been turned on. As the primary winding current through W2 increases to a predetermined level, the other transistors will remain off. However, as the predetermined current level is attained, transistor Q3 will turn on. With transistor Q3 turned on, the bases of both Q6 and Q9 are lowered. However, Q9 is not turned on since it is still reverse biased at this point due to the voltage across W3. However, Q6 is turned on in response to the turn on of Q3.

The turning on of Q6 further results in turned on Q5 and Q4 as may be appreciated from FIG. 6. At the same time, Q10 is turned off. Accordingly, as in the earlier discussed embodiment, the emitter voltage of Q1 is forced upwardly while the base voltage of Q1 is abruptly lowered to thus reverse bias the base-emitter junction of Q1 and force the desired switching transition. In addition, the PNP and NPN transistors Q6 and Q5 respectively are connected as shown in FIG. 6 as an SCR type of circuit (explained in more detail with respect to FIG. 5). Accordingly, Q5 and Q6 will remain on until the voltage cross tertiary winding W3 actually reverses thus lowering the current therethrough below the threshold value necessary to maintain this SCR type of arrangement in its on condition.

Accordingly, the base-emitter voltage on Q1 is reverse biased as long as there is any main current through Q1 and this reverse biasing is maintained so long as there is any base voltage in the positive direction with respect to Q1 across the tertiary winding W3. The symmetrical operation of the remaining component of the FIG. 6 circuit should now be appreciated without further discussion.

Although only a few specific embodiments of this invention have been described in detail above, those in the art will appreciate that many modifications and variations of these exemplary embodiments may be made without materially departing from the novel and advantageous features of this invention. Accordingly, all such variations and modifications are intended to be included within the scope of this invention ad defined by the appended claims.

What is claimed is:

1. An electrical inverter circuit for converting a d.c. electrical input into an a.c. electrical output, said inverter circuit comprising:

a transformer structure having secondary winding means for supplying said electrical output and a primary winding means, said winding means being magnetically coupled to each other through magnetic circuit means, active element switch means electrically connected to said primary winding means and electrically connectable to said d.c. electrical input for alternately switching said d.c. electrical input to said primary winding means for producing corresponding varying magnetic fields in said magnetic circuit means and thereby producing said a.c. electrical output in said secondary winding means, and electrical control means electrically connected to said active element switch means for monitoring the magnitude of electrical current flowing in said primary winding means and controlling said alternate switching operation in response to the detection of current in said primary winding in excess of a predetermined level, said electrical control means including a further controllable active element means in circuit with said active element switch means such that the primary winding current also flows therethrough and synchronous control means for synchronously controlling said further active element means so as to increase the electrical impedance thereof during at least a portion of each switching transition of said active element switch means.

2. An electrical inverter circuit as in claim 1 wherein:

said active element switch means comprises two transistor devices each having base, emitter and collector elements where the collector-emitter circuits of each are separately connected to the primary winding means so as to cause differing current flows therein when respectively controlled to an on state and where the collector-emitter circuits of each are commonly connected in circuit with said further controllable active element means, said electrical control means and said synchronous control means comprises a current measuring element connected serially in said common collector-emitter circuit with said further controllable active element means and current level detection means electrically connected to said current measuring element, and said current level detection means is also electrically connected to said further controllable active element means for substantially simultaneously increasing the electrical impedance thereof upon the detection of said predetermined level.

3. An electrical inverter circuit as in claim 2 wherein said further controllable active element means comprises a transistor device having base, emitter and collector elements where the collector-emitter circuit thereof is connected in said common collector-emitter circuit and where the base thereof is connected to said current level detection means.

4. An electrical inverter circuit as in claim 2 wherein said current measuring element comprises a device having a predetermined electrical impedance.

5. An electrical inverter circuit as in claim 2 wherein said current level detection means comprises a transistor device having base, emitter and collector elements where the base element thereof is connected to said current measuring element and where the collector-emitter circuit thereof is connected in circuit with the base elements of said active element switch means.

6. An electrical inverter circuit as in claim 2 wherein said electrical control means further comprises:

voltage detection means connected to said further controllable active element means and in circuit with the base elements of said active element switch means for detecting said increase in electrical impedance by detecting a corresponding temporary voltage rise across said further controllable active element during current switching transistion and for substantially dissipating any forward bias currents at said base elements in response thereto.

7. An electrical inverter circuit as in claim 6 further comprising an additional means connected for control by said voltage detection means and connected to maintain the increased impedance of said further controllable active element in response to said detected voltage rise.

8. An electrical inverter circuit as in claim 2 wherein said current level detection means is electrically connected in parallel across the serial connection of said current measuring element and said further controllable active element.

9. An electrical inverter circuit as in claim 8 wherein said current level detection means comprises a voltage divider and a voltage sensitive device connected for control thereby.

10. An electrical inverter circuit as in claim 1 wherein:

said active element switch means comprises two transistor devices each having base, emitter and collector elements where the collector-emitter circuits of each are separately connected to the primary winding means so as to cause differing current flows therein when respectively controlled to an on state, said further controllable active element means comprises two separate elements respectively in series circuit with said collector-emitter circuits, said electrical control means and said synchronous control means comprises a current measuring element connected in common with said separate elements and current level detection means electrically connected in circuit with said current measuring element, and said current level detection means is also electrically connected to control both of said separate elements for substantially simultaneously increasing the electrical impedances thereof upon detection of said predetermined level.

11. An electrical inverter circuit as in claim 10 wherein said electrical control means further comprises separate base bias control means each separately in circuit with its respectively associated active switch means base element and connected for control by said current level detection means for substantially dissipating any forward bias currents at the respectively associated base elements in response to the detection of said predetermined level.

12. An electrical inverter circuit as in claim 1 wherein said electrical control means comprises:

current monitoring means connected to a control lead of said further controllable active element for automatically detecting the current level flowing therethrough and for automatically controlling the electrical impedance thereof when a predetermined current level is detected.

13. An electrical inverter circuit as in claim 12 wherein said current monitoring means comprises an inverting current source.

14. An electrical inverter circuit as in claim 13 wherein:

said further controllable active element comprises a transistor device having base, emitter and collector elements where the collector-emitter circuit thereof is connected to carry said primary winding current, said current monitoring means comprises another transistor device having base, emitter and collector elements where said base elements are electrically connected together, where at least one pair of said emitter and collector elements are electrically connected together and where the remaining element of said another transistor device is electrically connected to said common base connection and where said transistor devices have respectively associated active areas having a predetermined area ratio.

15. An electrical inverter circuit as in claim 12 wherein said electrical control means comprises:

voltage detection means connected to said further controllable active element means and in circuit with the control elements of said active element switch means for detecting said increase in electrical impedance by detecting a corresponding temporary voltage rise across said further controllable active element during current switching transistion and for substantially dissipating any forward bias currents at said control elements in response thereto.

16. An electrical inverter circuit as in claim 1 wherein said electrical control means includes hysteresis means connected to insure that the active element switch means are positively controlled to their off state during switching transition periods.

17. An electrical inverter circuit as in claim 16 wherein said hysteresis means comprises a current sensitive latch connected to the control elements of said active element switch means for dissipating current therefrom once triggered to a conductive state by detection of said predetermined level until the level of such current falls below a predetermined lower limit whereupon said current sensitive latch automatically reverts to a non-conductive state.

18. An electrical inverter circuit as in claim 17 wherein said current sensitive latch comprises an NPN and PNP transistor device having respectively interconnected base and collector elements.

19. An electrical inverter circuit as in claim 16 wherein:

said active element switch means comprise two transistor devices having base, emitter and collector elements, and said hysteresis means comprise separate current sensitive latch means respectively connected in circuit with the base elements of said active element switch means for dissipating current therefrom once triggered to a conductive state by detection of said predetermined level until the level of such current falls below a predetermined lower limit whereupon said current sensitive latch means each automatically revert to a non-conductive state.

20. An electrical inverter circuit as in claim 19 wherein said current sensitive latch means each comprise an NPN and PNP transistor device having respectively interconnected base and collector elements.

*21. An electrical switching circuit for efficiently interrupting current flow between a first terminal and a second terminal comprising, in combination:*

*a first transistor switching element including a collector, a base, and an emitter, the collector of said first element being connected to said first terminal;*

*a second switching element connected, in series, between said emitter and said second terminal; and*

*control circuit means which function to initiate interruption of current flow between said first terminal and said second terminal by removing a control current from said base and simultaneously increasing the electrical impedance of said second switching element.*

*22. The circuit of claim 21 wherein said second switching element includes a second transistor.*

*23. The circuit of claim 22 wherein said control circuit means include a third switching element, connected between said base and said second terminal.*

*24. The circuit of claim 23 wherein said third switching element is a transistor and wherein said control circuit means function to force said second transistor into a non-conducting state and to simultaneously force said third transistor into a conducting state.*

*25. The circuit of claim 24 wherein said first switching element, said second switching element, and said third switching element are npn transistors and wherein said first terminal is positive with respect to said second terminal.*

*26. A method for shutting off electric current flow from a first terminal through a series semiconductor switch to a second terminal comprising the steps of:*

*removing current from a control element of said semiconductor switch; and*

*simultaneously increasing the impedance of a first auxiliary switching element connected in series between a emitter of said semiconductor switch and said second terminal.*

*27. The method of claim 26 wherein said first auxiliary switching element is a first transistor and said step of increasing the impedance of said first switching element includes the step of biasing said first transistor into a non-conducting state.*

*28. The method of claim 26 wherein said step of removing current includes decreasing the impedance of a second auxiliary switching element connected between said control element and said second terminal.*

*29. The method of claim 28 wherein said first auxiliary switching element is a first transistor and said second auxiliary switching element is a second transistor.*

*30. The method of claim 28 wherein said first auxiliary switching element is a transistor and said second auxiliary switching element is a silicon controlled rectifier.*

* * * * *